US008684783B2

(12) United States Patent
Ehrsam

(10) Patent No.: US 8,684,783 B2
(45) Date of Patent: Apr. 1, 2014

(54) MAGNETICALLY COUPLED MANNEQUIN JOINT

(71) Applicant: Anna Ehrsam, Brooklyn, NY (US)

(72) Inventor: Anna Ehrsam, Brooklyn, NY (US)

( * ) Notice: Subject to any disclaimer, the term of this patent is extended or adjusted under 35 U.S.C. 154(b) by 0 days.

(21) Appl. No.: 13/672,532

(22) Filed: Nov. 8, 2012

(65) Prior Publication Data

US 2013/0064599 A1    Mar. 14, 2013

Related U.S. Application Data

(63) Continuation of application No. 12/495,956, filed on Jul. 1, 2009, now abandoned.

(51) Int. Cl.
  *A63H 33/26* (2006.01)
(52) U.S. Cl.
  USPC ............... 446/139; 446/92; 446/97; 446/129; 446/378; 446/390; 223/66; 403/76; 403/164
(58) Field of Classification Search
  USPC ......... 446/133–139, 376, 378, 383, 390, 129, 446/92, 97; 223/68, 66; 403/76, 90, 164
  See application file for complete search history.

(56) References Cited

U.S. PATENT DOCUMENTS

| | | | | |
|---|---|---|---|---|
| 675,106 | A | * | 5/1901 | Oberle ............................ 248/49 |
| 703,899 | A | * | 7/1902 | Debes ........................... 446/383 |
| 807,895 | A | * | 12/1905 | Allert ............................ 446/378 |
| 1,191,691 | A | * | 7/1916 | Greenwald ...................... 223/68 |
| 1,456,422 | A | * | 5/1923 | Cabana .......................... 446/381 |
| 1,520,564 | A | * | 12/1924 | Deutsch ......................... 446/378 |
| 1,601,447 | A | * | 9/1926 | Huck ............................. 446/375 |
| 2,174,932 | A | * | 10/1939 | Weis et al. ..................... 446/378 |
| 2,194,460 | A | * | 3/1940 | Heimann ....................... 446/378 |
| 2,215,500 | A | * | 9/1940 | Greneker ......................... 223/68 |
| 3,068,515 | A | | 12/1962 | Nassour |
| 3,068,615 | A | * | 12/1962 | Nassour ........................ 446/139 |
| 3,140,712 | A | | 7/1964 | Hunter |
| 3,196,579 | A | * | 7/1965 | Lepper ............................. 446/92 |
| 3,246,422 | A | | 4/1966 | Teagarden |
| 3,375,604 | A | | 4/1968 | Alonso |
| 3,433,510 | A | * | 3/1969 | Hulterstrum ..................... 403/77 |
| 3,691,788 | A | * | 9/1972 | Mazziotti ....................... 464/139 |
| 3,841,769 | A | * | 10/1974 | Bowerman ...................... 403/90 |
| 3,883,984 | A | | 5/1975 | Champeaux |
| 4,024,588 | A | | 5/1977 | Janssen et al. |
| 4,038,775 | A | * | 8/1977 | Sato ............................... 446/92 |
| 4,118,888 | A | * | 10/1978 | Ogawa ............................ 446/92 |
| 4,620,813 | A | * | 11/1986 | Lacher ............................ 403/93 |
| 5,092,898 | A | | 3/1992 | Bekki et al. |
| 5,295,889 | A | * | 3/1994 | Ejima ............................. 446/91 |
| 5,897,417 | A | * | 4/1999 | Grey ............................. 446/125 |
| 5,897,420 | A | | 4/1999 | Lawrence et al. |
| 6,087,824 | A | | 7/2000 | Shiao |
| 6,109,815 | A | * | 8/2000 | Merlo ............................. 403/90 |
| 6,203,396 | B1 | * | 3/2001 | Asmussen et al. ............ 446/376 |
| 6,217,249 | B1 | * | 4/2001 | Merlo ............................. 403/90 |

(Continued)

*Primary Examiner* — Gene Kim
*Assistant Examiner* — Matthew B Stanczak
(74) *Attorney, Agent, or Firm* — Fish & Richardson P.C.

(57) ABSTRACT

The present invention is directed to a mannequin having one or more articulated joints capable of exhibiting a full range of motion and of supporting substantial weight. In particular, this invention relates to an apparatus for movably joining two parts of a mannequin. The apparatus includes a first element having an arcuate surface and a second element having a convex surface and a magnetic portion. The second element is movably engageable with the first element.

5 Claims, 18 Drawing Sheets

(56) References Cited

U.S. PATENT DOCUMENTS

| | | |
|---|---|---|
| 6,350,076 B1 | 2/2002 | Wagner et al. |
| 6,494,635 B1 * | 12/2002 | Merlo .............................. 403/90 |
| 7,063,480 B2 | 6/2006 | Ersoy et al. |
| 7,144,179 B2 * | 12/2006 | Varner et al. .................... 403/24 |
| 7,170,285 B2 | 1/2007 | Spratte |
| 7,171,330 B2 | 1/2007 | Kruse et al. |
| 7,305,864 B2 | 12/2007 | Graber et al. |
| 7,322,873 B2 * | 1/2008 | Rosen et al. .................... 446/91 |
| 7,325,996 B2 * | 2/2008 | Varner et al. .................... 403/24 |
| 7,405,557 B2 | 7/2008 | Spratte et al. |
| 7,475,858 B2 | 1/2009 | Kalis et al. |
| 2003/0147688 A1 * | 8/2003 | Hathaway ....................... 403/90 |
| 2007/0060011 A1 | 3/2007 | Daftari et al. |
| 2008/0089739 A1 | 4/2008 | Varner et al. |
| 2008/0139077 A1 * | 6/2008 | Patton ............................. 446/92 |

\* cited by examiner

MAGNETICALLY COUPLED MANNEQUIN JOINT

TECHNICAL FIELD

This invention relates to a jointed mannequin, and more particularly to a system of magnetically coupled joints for moveably connecting parts of a mannequin.

BACKGROUND

Mannequins have been useful for displays in many fields including retail, education, museums and exhibits. Mannequins have been constructed of wood, plaster, wax and other materials. The ability to position a mannequin into a variety of life-like poses is important, particularly in the use of life-size mannequins in high quality displays, such as museum exhibitions.

Existing mannequins cannot be repositioned easily because the joints used to connect parts of a mannequin together are often fixed and not easily adjustable. Thus, it is often necessary to remove or replace a mannequin's limb in order to alter its positioning. In fact, because existing mannequin joints do not mimic human joints, certain mannequin positions cannot be achieved even by removing or replacing limbs. Therefore, it is often necessary to custom design or custom order mannequins that are already in the desired positions, which involves added cost.

Existing movable joints are problematic since their range of movement is fairly limited, and is usually restricted to rotation within a single plane. Existing flexible mannequins are often constructed out of a flexible steel (or wire) core and an exterior made of foam or other flexible material. Because such a composition does not replicate the anatomy and positioning of real joints, natural human-like poses are hard to achieve.

Furthermore, existing mannequins are unable to support any significant weight, which prevents the use of props in high quality displays.

SUMMARY

The present invention is directed to a mannequin having articulated joints capable of exhibiting a full range of motion and of supporting substantial weight.

In particular, this invention relates to an apparatus for movably joining two parts of a mannequin, where the first element has an arcuate surface and the second element, which has a convex surface and a magnetic portion, is movably engageable with the first element.

In one implementation, the second element has a first convex surface and a magnetic convex surface, where the magnetic convex surface at least partially extends from the first convex surface. Two elements of a mannequin can be moveably joined where the first element has an arcuate surface, and the second element has two convex surfaces, the first convex surface extending at least partially from the second convex surface. The first element and the second element are magnetically joined when the second convex surface of the second element maintains contact with the arcuate surface of the first element through a range of motion.

The implementations of the invention may incorporate one or more of the following features: one or more nested arcuate surfaces, one or more multiple magnetic surfaces; one or more magnetic surfaces within one or more nested arcuate surfaces, one or more ball bearings, one or more magnetized ball bearings, one or more pivot bearings, one or more magnetized pivot bearings, one or more roller bearings; one or more magnetized roller bearings.

The claimed invention allows for a full range of motion of limbs of a mannequin, which enables life-like positions and allows for dynamic and realistic displays. The claimed invention also allows for easy repositioning, detachment and re-attachment of mannequin limbs. This decreases cost since replacing the entire mannequin or a particular mannequin limb is unnecessary in order to achieve different positions. Easy detachment and re-attachment of mannequin limbs also allows for their interchangeability among different mannequins.

Further, the claimed invention allows for movement of one or more including all parts of a mannequin at various joints, for example, at the hip joints, knee joints, ankle joints, toe joints, shoulder joints, elbow joints, wrist joints, and finger joints. The claimed invention can also allow for movement at the neck, jaw, and back or spine, much like a human or other animal, and is not limited to movement of only the major limbs (arms and legs). The claimed invention allows for easy manipulation to accomplish a variety of displays and accommodate different venues.

Because of the flexibility of movement and easy detachment and re-attachment of limbs, costuming a mannequin embodying the claimed invention is easier than costuming a stiff mannequin incapable of motion. Further, the flexibility of mannequin parts provided by the claimed invention makes transportation of mannequins easier since their parts can be disassembled and arranged to accommodate different shapes and sizes of packaging. The claimed invention further enables a mannequin to support substantial weight, which allows for use of various props in displays.

The term mannequin is not intended to be limited to a life-size representation of the human form, as illustrated in the disclosed embodiments, but can include any three-dimensional representation of any human, human-like, animal or animal-like form, or any part thereof, and can vary in size and shape, as well as in the accuracy of its depiction with regard to anatomy or the amount of detail.

DESCRIPTION OF DRAWINGS

Like reference symbols in the various drawings indicate like elements.

DETAILED DESCRIPTION

Figure 1A:
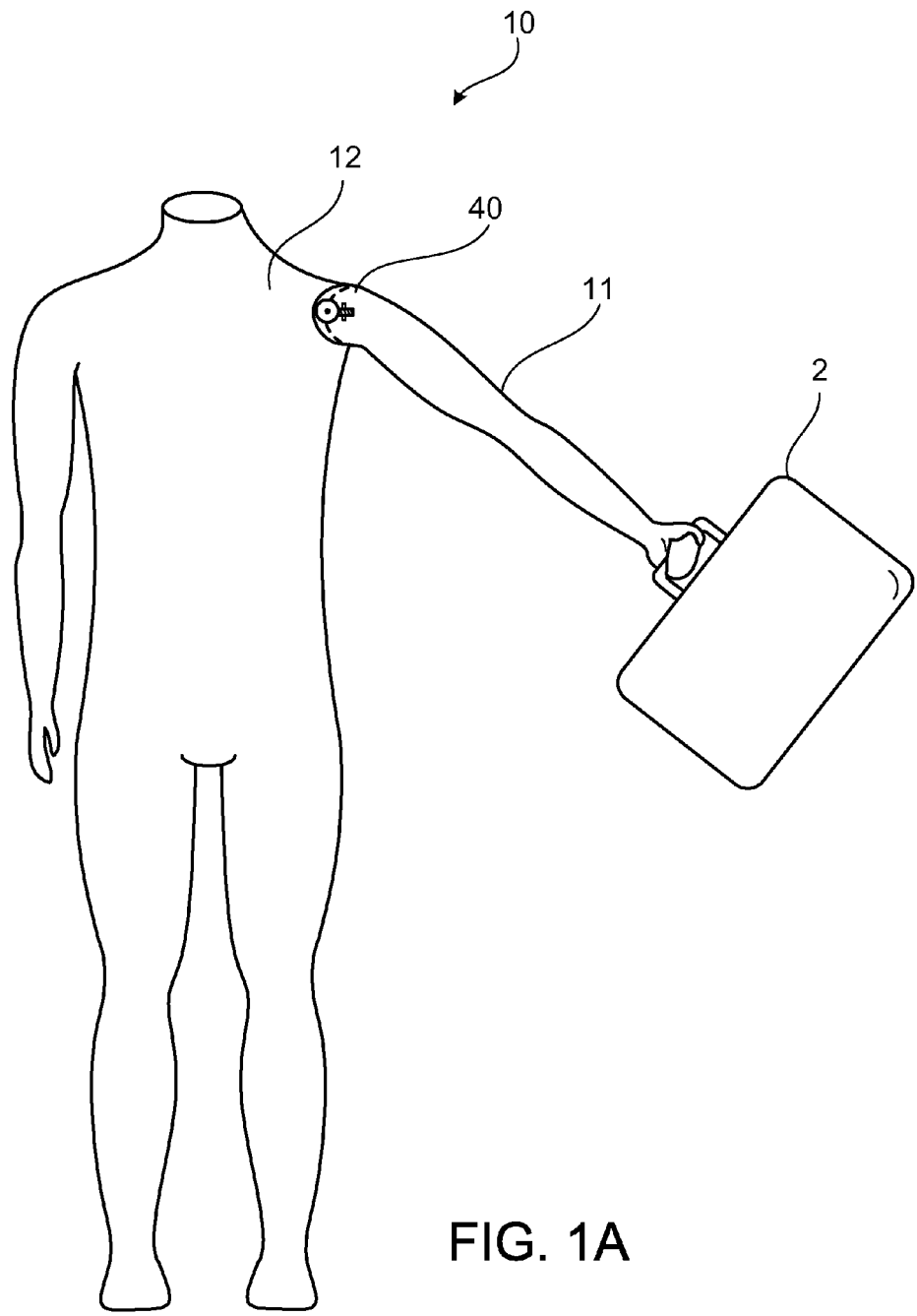
FIG. 1A is a front view of a mannequin in a display setting embodying aspects of a shoulder joint of the invention.

Referring initially to FIG. 1A, mannequin 10 is a lifelike form in a display setting. Mannequin 10 includes limb 11 and torso 12 and can be arranged in a variety of positions to add realism and aesthetically desirable qualities to the display. As illustrated, mannequin 10 is holding an object 2 with limb 11. Object 2 can be any article. Specifically, in a museum display or exhibition, object 2 can be an object consistent with the display setting, including articles having significant weight, for example, and without limitation, bags, luggage, sports equipment, tools, weapons, or another mannequin. Alternatively, in some embodiments, object 2 can be the weight of limb 11 itself.

Mannequin 10 can include an articulated joint 40 between limb 11 and torso 12 to facilitate the positioning of mannequin 10 into life-like or aesthetically desirable positions. Joint 40 is capable of supporting object 2 while maintaining a fixed position of limb 11 relative to torso 12 and the rest of mannequin 10. In FIG. 1A, joint 40 acts as a shoulder joint, magnetically coupling mannequin torso 12 and limb 11. The magnetic coupling of the joint allows for a wide range of motion of limb 11 while supporting the weight of object 2.

Figure 1B:
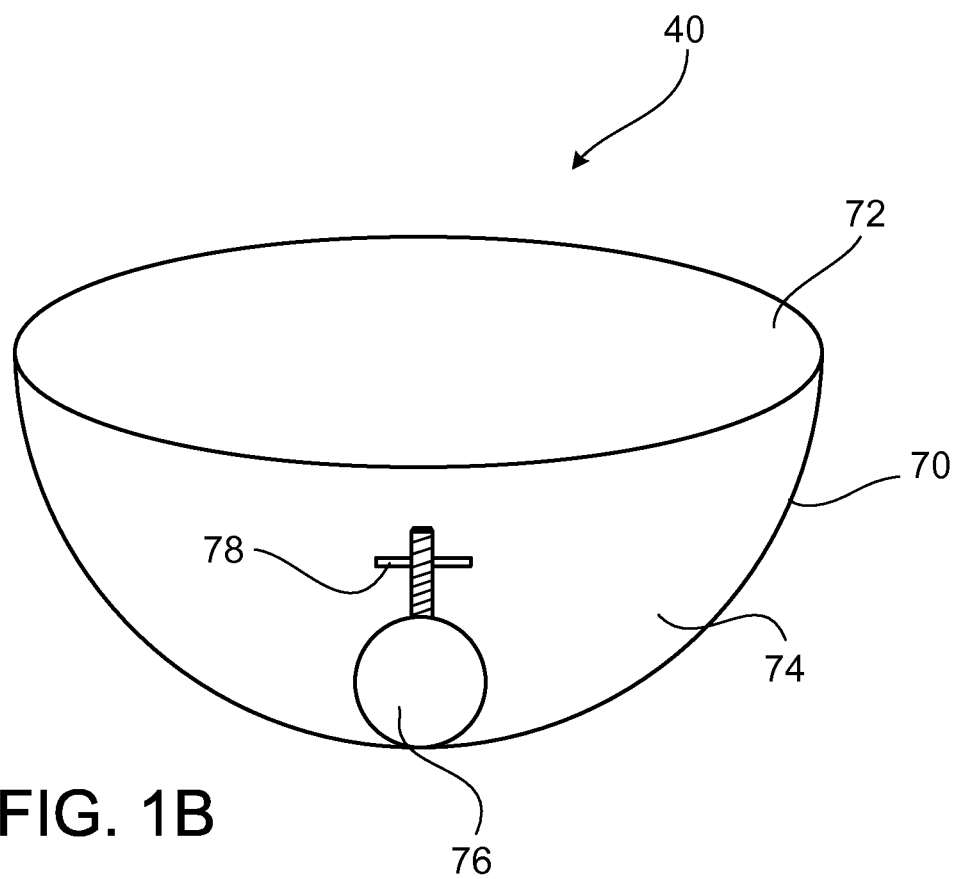
FIG. 1B is an exploded isometric view of an embodiment of a joint of the invention.

Referring to FIG. 1B, joint 40 comprises surface 70 and sphere 76. Surface 70 can be any arcuate surface, for example, a hemisphere, or a portion of a spherical surface, having an inner concave surface 72 and an outer convex surface 74. Surface 70 can also be a cylindrical surface or a section of a cylinder, such as a ring, having an inner concave surface 72 and an outer convex surface 74. Sphere 76 can be magnetically coupled to concave surface 72 or convex surface 74. Threaded rod 78 is fixed to sphere 76.

Figure 1C:
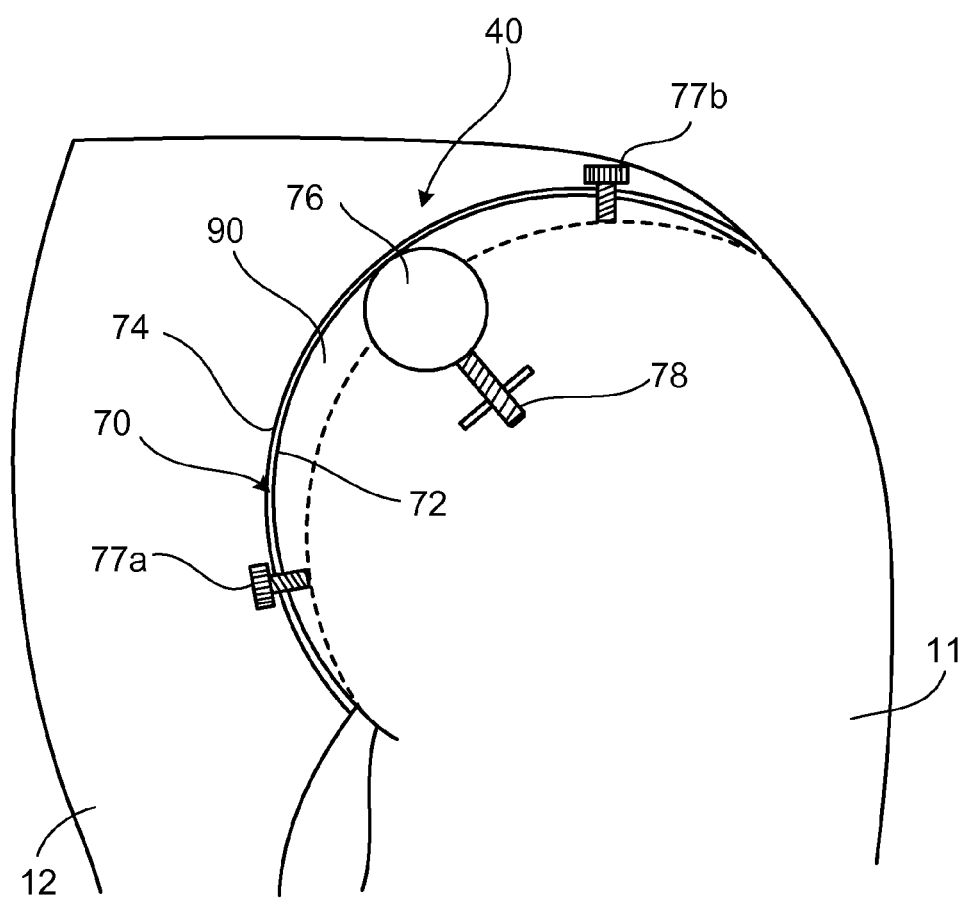
FIG. 1C is an exploded cross-section view of an embodiment of a shoulder joint of the invention.

Referring to FIG. 1C, joint 40 is positioned between limb 11 and torso 12. Surface 70 is mounted such that convex surface 74 is attached to torso 12. Sphere 76 is mounted to limb 11 by means of threaded rod 78 such that sphere 76 at least partially extends from limb 11. The magnetic attraction of sphere 76 to surface 70 is sufficient to support the weight of limb 11, while still allowing for a full range of motion between limb 11 and torso 12 to position the mannequin. Set screws 77a and 77b pass through torso 12 and surface 70, and secure limb 11 in place. Set screws 77a and 77b enable mannequin limb 11 to support a weight of about 20 lbs. The weight supported by mannequin limb 11 can vary based on the size, number and placement of set screws.

To connect limb 11 with torso 12, limb 11 (including the portion of sphere 76 extending from limb 11) is positioned with respect to torso 12 (and thus concave surface 72) until the portion of sphere 76 extending from limb 11 is pulled into concave surface 72 by the magnetic attraction between surface 70 and sphere 76, and sphere 76 contacts concave surface 72. In this alignment, limb 11 is rotatably secured to torso 12.

Limb 11 is disconnected from torso 12 by rotating limb 11 along surface 72 while pulling limb 11 away from torso 12.

Figure 1D:
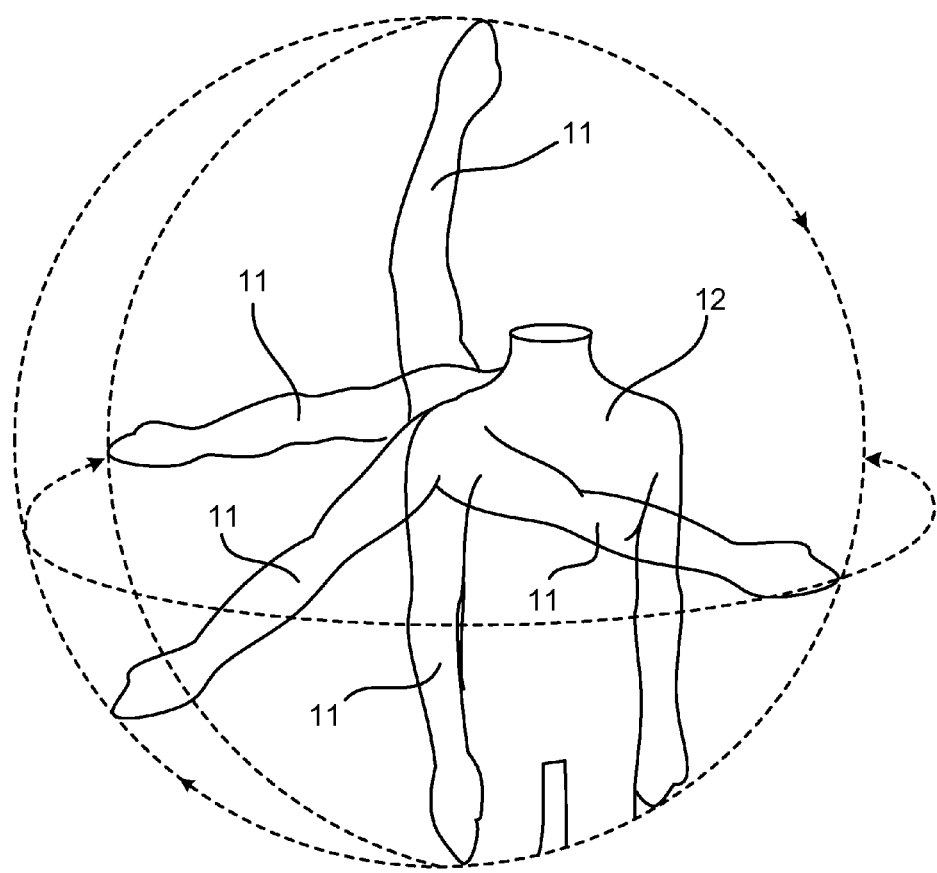
FIG. 1D is a three-dimensional view of the range of motion of a shoulder joint of the invention.

Referring to FIG. 1D, joint 40 (not shown in FIG. 1D) allows for a multi-axial range of motion. Limb 11 can rotate up to 360 degrees (e.g., through 45, 60, 90, 120, 150, 180, 220, 240, 260, 270, 280, 300, 320, and 360 degrees) parallel to torso 12 and 180 degrees or more (e.g. 180, 200, 220, 240, 260, 280, 300, 320, 340, 360 degrees) across torso 12.

Referring back to FIG. 1C, distance 90 between surface 70 and limb 11 can be consistent along concave surface 72 or can vary, for example, it can diminish toward the edges of concave surface 72, as shown in FIG. 1C. To achieve an optimal range of motion, limb 11 and surface 70 can maintain a distance 90 of between 0.0625" and 2" (e.g., about 0.0625", 0.125", 0.25", 0.5", 0.75", 1.0", 1.25", 1.5", 1.75", 2.0", or any distance there between). Depending on the size of joint 40 and/or the display mannequin, the distance 90 between limb 11 and surface 70 can be less than 0.0625" or greater than 2.0".

In some embodiments, sphere 76 can include a magnetic material and surface 70 can include a permanent magnet, a ferromagnetic material (such as iron or steel), or other magnetic materials. In other embodiments, concave surface 72 of surface 70 can be made of plastic or other non-magnetic material, while convex surface 74 can be made of a magnetic material to magnetically couple sphere 76 and surface 70. In some embodiments, sphere 76 can include a non-magnetic material and surface 70 can include a magnetic material. In other embodiments, sphere 76 can include a magnetic material and surface 70 can be made of metal or other non-magnetic material.

Sphere 76 can be a true sphere, a partial sphere, oblong, egg-shaped, flat surfaced, a cube, or a combination of shapes such that magnetic forces between sphere 76 and surface 70 attach limb 11 to torso 12 in a manner that supports the weight of object 2 and maintains the relative positions of limb 11 and torso 12, while providing for freedom of movement of limb 11.

In various embodiments, surfaces 72 and 74 can be convex and concave respectively, or concave and convex respectively. Surfaces 72 and 74 can also both be concave or both be convex. Surfaces 72 and 74 can be configured to allow for relative movement between the surfaces. Surfaces 72 and 74 can also be in direct contact with each other or separated by a gap, such gap being formed by sphere 76, bearings, such as ball bearings, a fluid layer, lubricant, silicon rubber, urethane rubber, silicon spray, or other means. Such gap between surfaces 72 and 74 does not interfere with the magnetic attractive force between sphere 76 and surface 70.

The magnetic force between sphere 76 and surface 70 varies based on the size of the magnetic sphere 76 and the thickness of surface 70. In various embodiments, the magnetic force between sphere 76 and surface 70 is 8000 gauss where surface 70 is ¼" thick and sphere 76 is 1¼" in diameter. The magnetic force can vary based on the size and types of the magnets used.

Figure 1E:
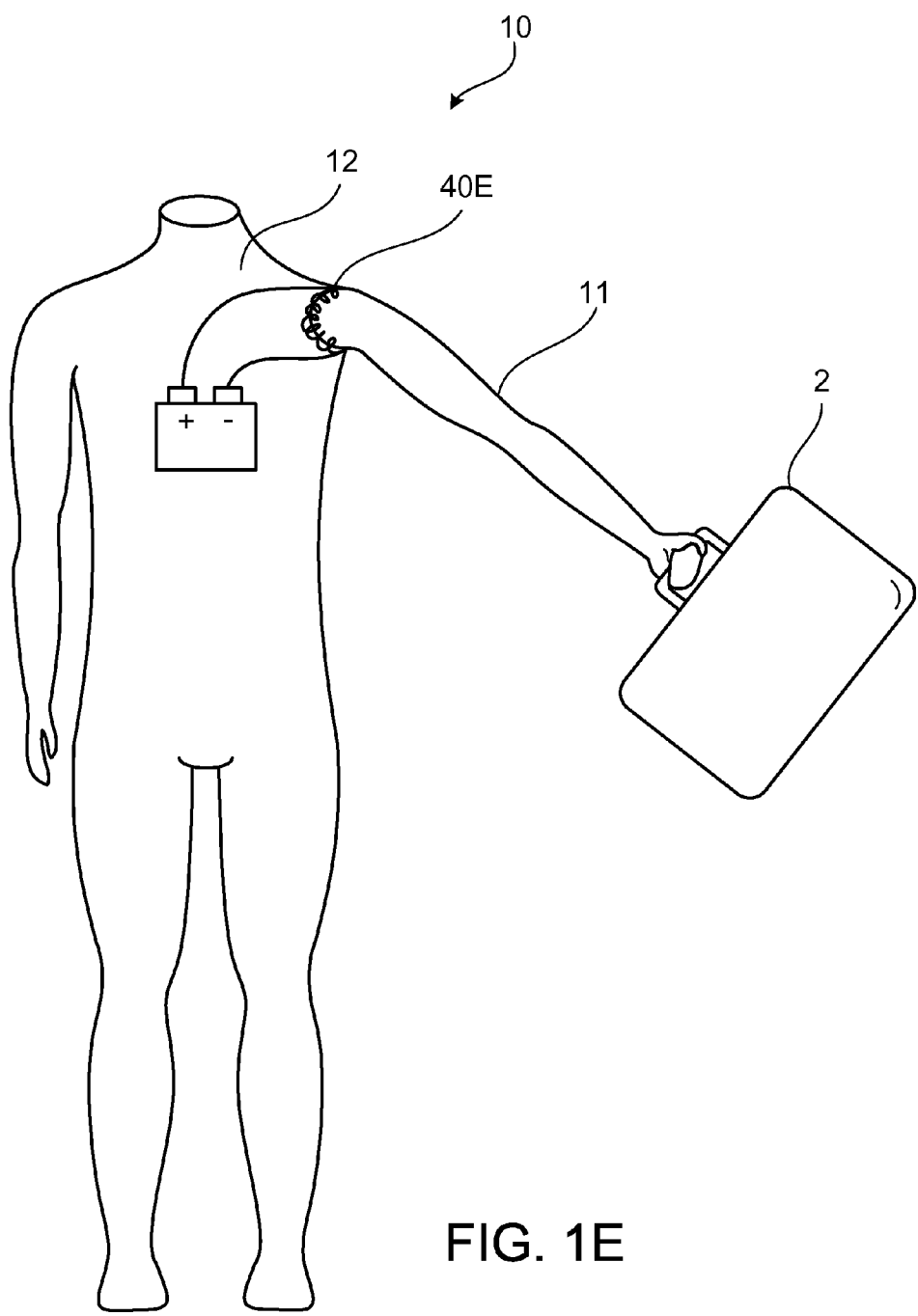
FIG. 1E is a front view of a mannequin embodying aspects of a shoulder joint of the invention where the shoulder joint is connected using electromagnetic means.

In other embodiments, sphere 76 and surface 70 can be coupled using an electromagnetic force, as illustrated in FIG. 1E, where joint 40E connects mannequin torso 12 and mannequin limb 11 using electromagnetic means.

Figure 1F:
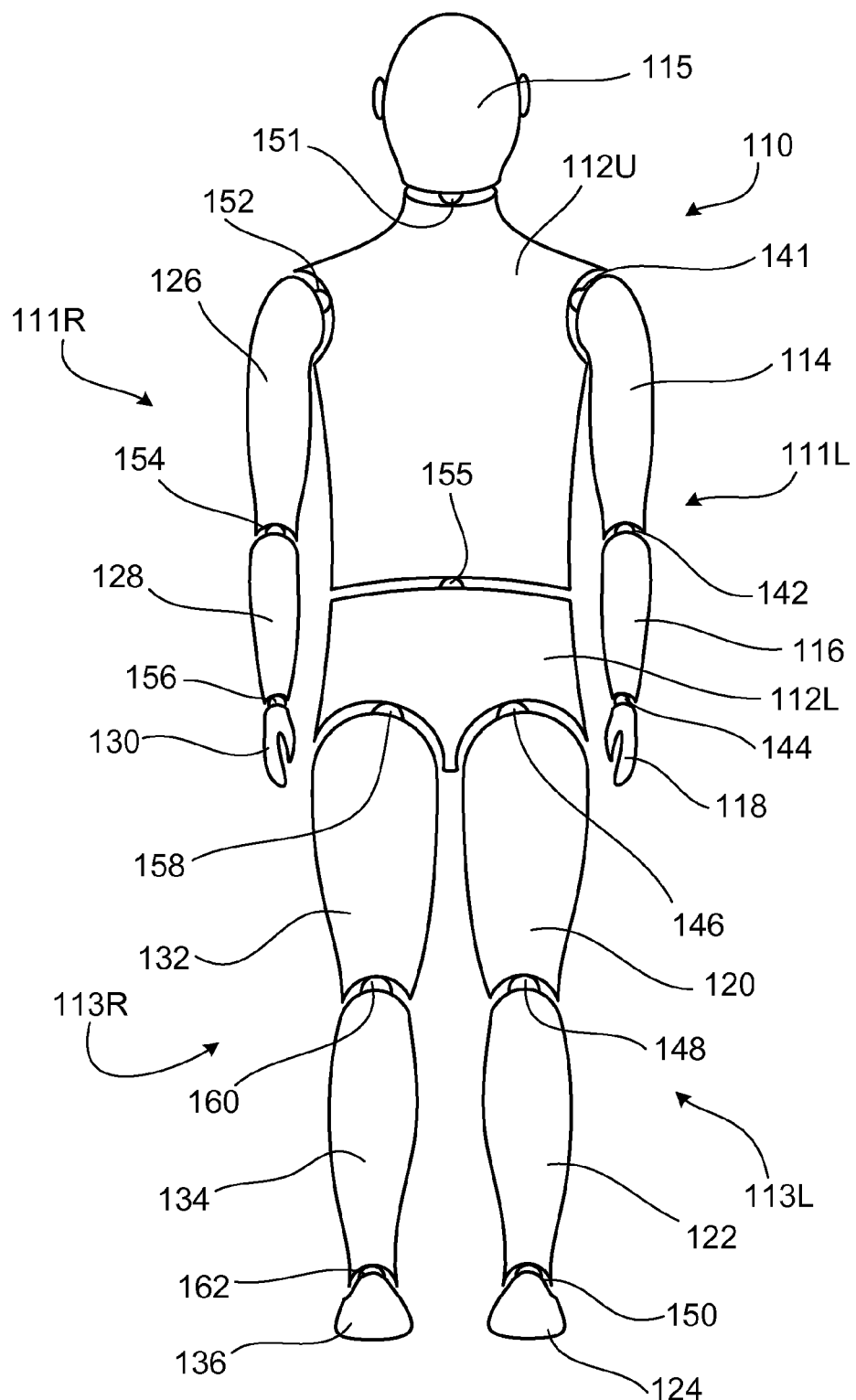
FIG. 1F is a front view of a mannequin of the invention with movable and detachable limbs.
Figure 1G:
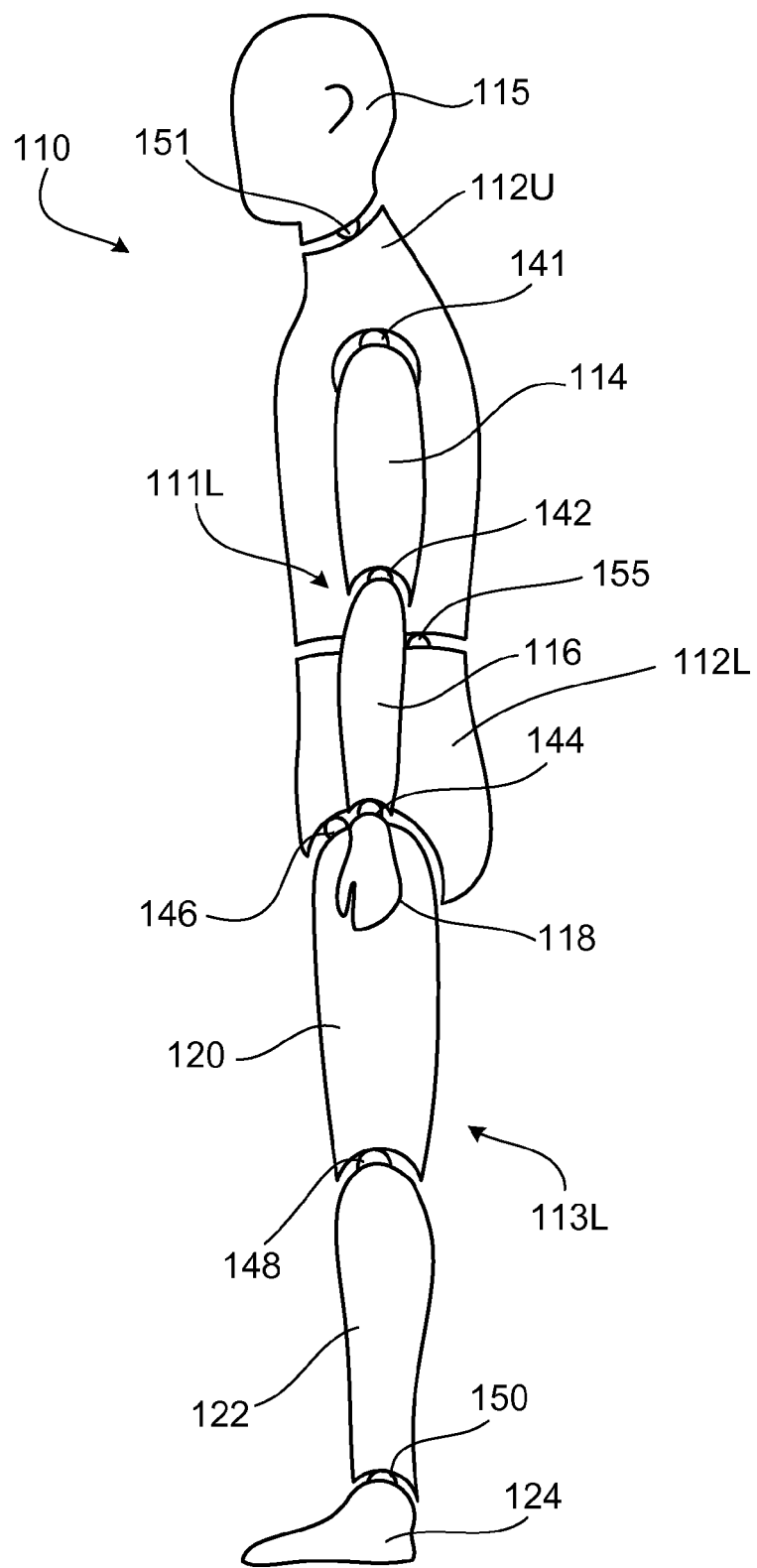
FIG. 1G is a side view of a mannequin of the invention with movable and detachable limbs.

Referring now to FIGS. 1F and 1G, an exemplary embodiment includes a human form mannequin having magnetically coupled ball-and-socket joints used to movably connect two or more parts of the mannequin. The joints allow for a controlled range of motion, (e.g., a life-like range of motion), fixation of positions of the mannequin, and suspension of weight while maintaining a fixed mannequin position.

FIG. 1F shows a front view of mannequin 110 having a head 115, an upper torso portion 112U, a lower torso portion 112L, and movable, detachable limbs 111L, 111R, 113L and 113R. In various embodiments, limbs 111L and 111R can be attached to upper torso 112U, and 113L and 113R can be attached to lower torso 112L using moveable joints 40, as described above. Also, in various embodiments, one, two or none of limbs 111L and 111R can be attached to upper torso 112U, and one, two or none of limbs 113L and 113R can be attached to lower torso 112L using movable joint 40.

Additionally, limb 111L can include upper left arm 114, lower left arm 116 and left hand 118. Limb 111L can include a moveable joint 40 between upper left arm 114 and lower left arm 116, and a moveable joint 40 between lower left arm 116 and left hand 118.

Similarly limb 111R can include upper right arm 126, lower right arm 128 and right hand 130, with a moveable joint 40 between upper right arm 126 and lower right arm 128, and a moveable joint 40 between lower right arm 128 and right hand 130.

Limb 113L can include upper left leg 120, lower left leg 122, and left foot 124, with a moveable joint 40 between upper left leg 120 and lower left leg 122, and a moveable joint between lower left leg 122 and left foot 124. Limb 113R can include upper right leg 132, lower right leg 134 and right foot 136, with a moveable joint 40 between upper right leg 132 and lower right leg 134, and a moveable joint between lower right leg 134 and right foot 136.

In various embodiments, mannequin 110 can include one or more moveable joints 40. For example, mannequin 110 can include one moveable joint between upper torso 112U and limb 111R. Mannequin 110 can also include multiple moveable joints 40, for example, a moveable joint 40 between limb 111R and upper torso 112U and a movable joint between limb 113L and upper torso 112U. Further yet, mannequin 110 can include moveable joints 40 between all limbs and upper torso 112U and lower torso 112L.

In various embodiments, limbs 111R, 111L, 113R and 113L can include one moveable joint 40. For example, limb 111R can include a moveable joint 40 between upper right arm 126 and lower right arm 128 with no moveable joint between lower right arm 128 and right hand 130.

Referring in particular to FIG. 1F, head 115 and upper torso 112U are movably connected at neck intersection 151. Upper torso 112U and lower torso 112L are movably connected at waist intersection 155. Upper torso 112U and upper left arm 114 are movably connected at left shoulder intersection 141. Upper left arm 114 and lower left arm 116 are movably connected at left elbow intersection 142. Lower left arm 116 and left hand 118 are movably connected at left wrist intersection 144. Lower torso 112L and upper left leg 120 are movably connected at left hip intersection 146. Upper left leg 120 and lower left leg 122 are movably connected at left knee intersection 148. Lower left leg 122 and left foot 124 are movably connected at left ankle intersection 150. Upper torso 112U and upper right arm 126 are movably connected at right shoulder intersection 152. Upper right arm 126 and lower right arm 128 are movably connected at right elbow intersection 154. Lower right arm 128 and right hand 130 are movably connected at right wrist intersection 156. Lower torso 112L and upper right leg 132 are movably connected at right hip intersection 158. Upper right let 132 and lower right leg 134 are movably connected at knee intersection 160. Lower right leg 134 and right foot 136 are movably connected at right ankle intersection 162. The intersections 141, 142, 144, 146, 148, 150, 151, 152, 154, 155, 156, 158, 160, or 162 can comprise moveable joint assembly 40, as described above.

FIG. 1G is a side view of FIG. 1F and shows the left side of mannequin 110 of this invention with movable and detachable limbs. Head 115 and upper torso 112U can be movably connected at intersection 151. Upper torso 112U and lower torso 112L can be movably connected at waist intersection 155. Upper torso 112 and upper left arm 114 can be movably connected at left shoulder intersection 141. Upper left arm 114 and lower left arm 116 can be movably connected at left elbow intersection 142. Lower left arm 116 and left hand 118 can be movably connected at left wrist intersection 144. Lower torso 112L and upper left leg 120 can be movably connected at left hip intersection 146. Upper left leg 120 and lower left leg 122 can be movably connected at left knee intersection 148. Lower left leg 122 and left foot 124 can be movably connected at left ankle intersection 150.

EXAMPLES

Figure 2A:
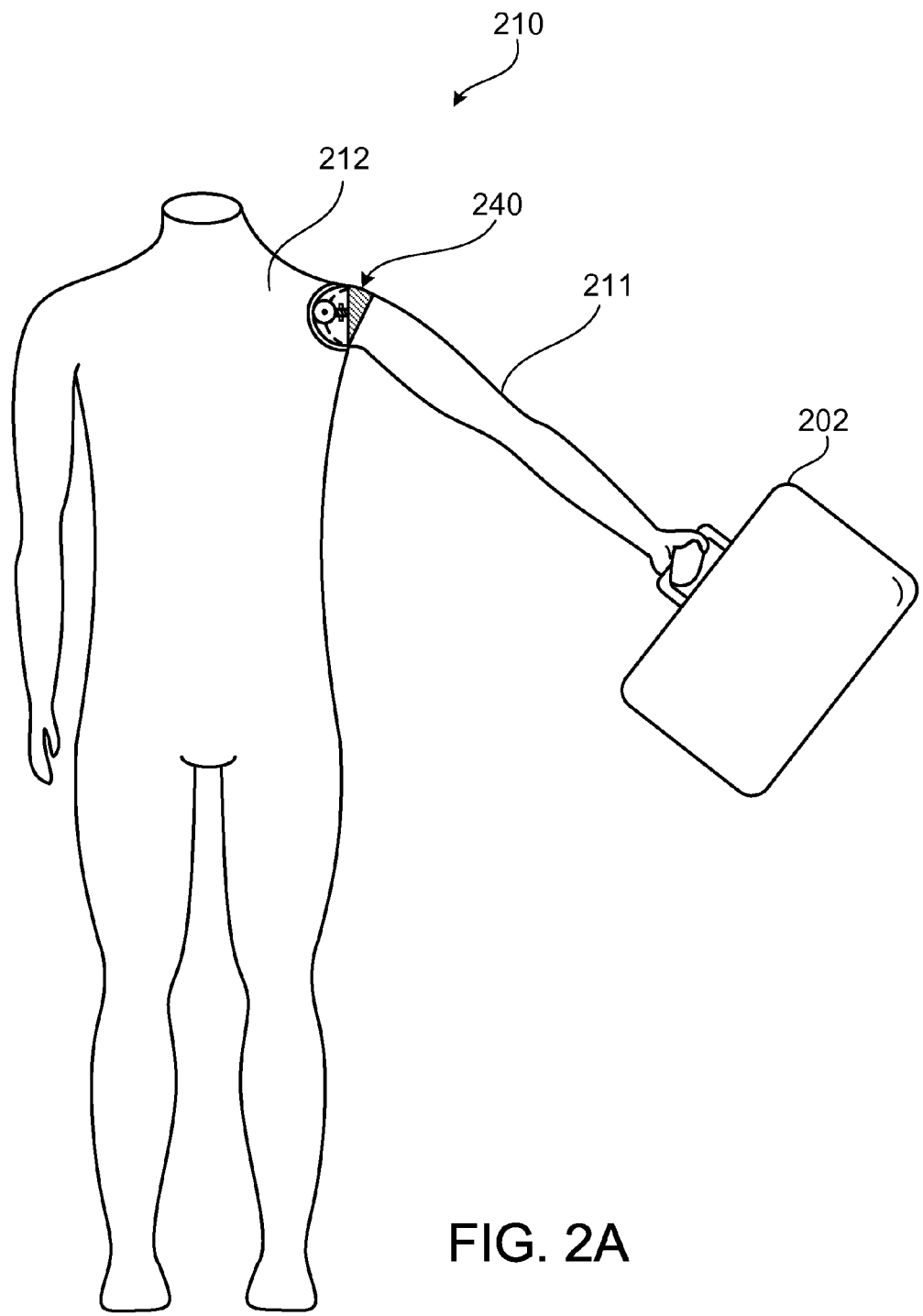
FIG. 2A is a front view of a mannequin embodying aspects of a shoulder joint of the invention.

Referring to FIG. 2A, mannequin 210 includes movable joint 240, which can act as a shoulder joint, magnetically coupling torso 212 and limb 211. The magnetic coupling of joint 240 allows for a wide range of motion of limb 211, and also allows mannequin 210 to support weight 202. In FIG. 2A, weight 202 is depicted as a heavy suitcase, but weight 202 can be any heavy object.

Figure 2B:
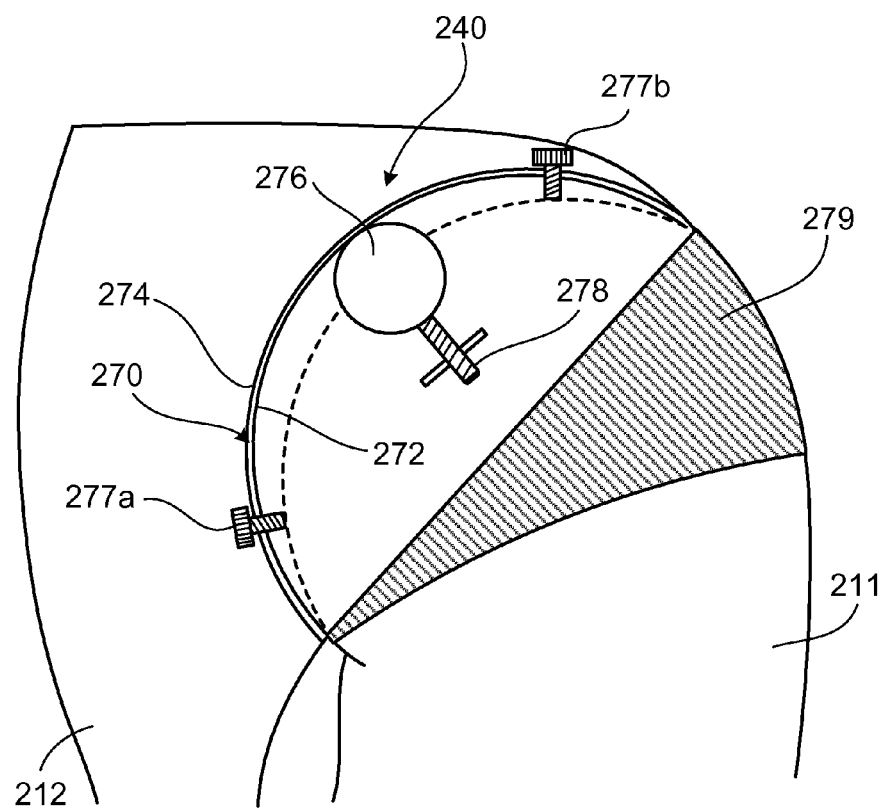
FIG. 2B is an exploded cross-section view of an embodiment of a shoulder joint of the invention.

Referring to FIG. 2B, magnetically coupled joint 240 mounts between torso 212 and limb 211. Surface 270, which includes convex surface 274 and concave surface 272, is mounted such that convex surface 274 is attached to torso 212. Sphere 276 is mounted to limb 211 by means of threaded rod 278, such that sphere 276 at least partially extends from limb 211.

Gasket 279 can extend around the perimeter of limb 211 at the point where limb 211 joins torso 212, as shown in FIG. 2B, in order to provide for additional friction, which helps to keep joint 240 in place and support more weight. Gasket 279 can also extend over the entire joint 240 and serve an aesthetic purpose to conceal the mechanism of joint 240 and imitate a human-like smooth surface from limb 211 to torso 212. Further yet, gasket 279 can fill the space between concave surface 272 and limb 211 in order to provide for additional friction, as well as to enable joint 240 to maintain an optimal distance between concave surface 272 and sphere 276 to ensure a complete range of motion. Gasket 279 can be made of various materials including silicone, urethane rubber or foam rubber.

Figure 3:
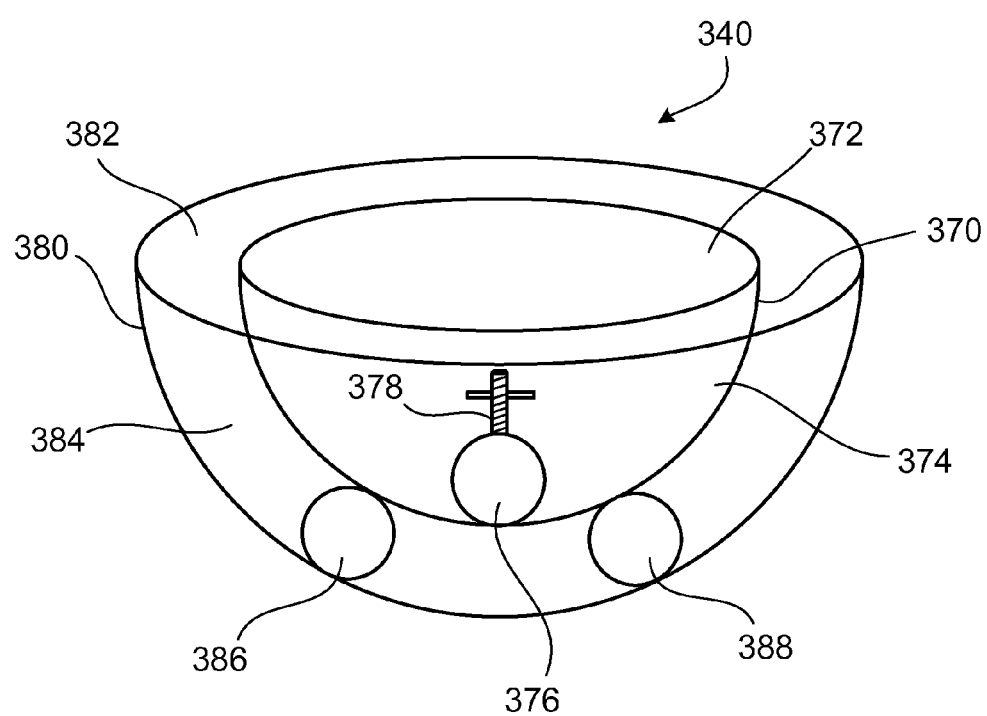
FIG. 3 is an exploded isometric view of an embodiment of a joint of the invention.

Referring to FIG. 3, a double articulated joint is illustrated having surfaces 370 and 380, sphere 376 and threaded rod 378. Surface 370 can be any arcuate surface having a concave surface 372 and a convex surface 374. Surface 380 is an arcuate surface having a concave surface 382 and a convex surface 384. Surface 380 is larger in size than surface 370, such that surface 370 is nested within surface 380. Supporting spheres 386 and 388 are mounted to concave surface 382 of surface 380 or partially inset in surface 380 and extending out of concave surface 382. Convex surface 374 of surface 370 is magnetically coupled to supporting spheres 386 and 388. Sphere 376 is magnetically coupled to concave surface 372 of surface 370.

Joint 340 can be used to magnetically connect two parts of a mannequin where, first, convex surface 384 of surface 380 is mounted to a first mannequin part, second, sphere 376 is mounted to a second mannequin part by means of threaded rod 378, such that sphere 376 at least partially extends from the second mannequin part, and third, surface 380 and sphere 376 are movably and magnetically coupled. Supporting spheres 386 and 388 can be mounted at different places along concave surface 382 to vary the magnetic distribution of joint

340. Further, more supporting spheres can be added along concave surface 382 for additional magnetic strength. Alternatively, supporting spheres 386 and 388 can be replaced by a ball bearing along concave surface 382 to maximize magnetic strength and facilitate rotation.

Figure 4:
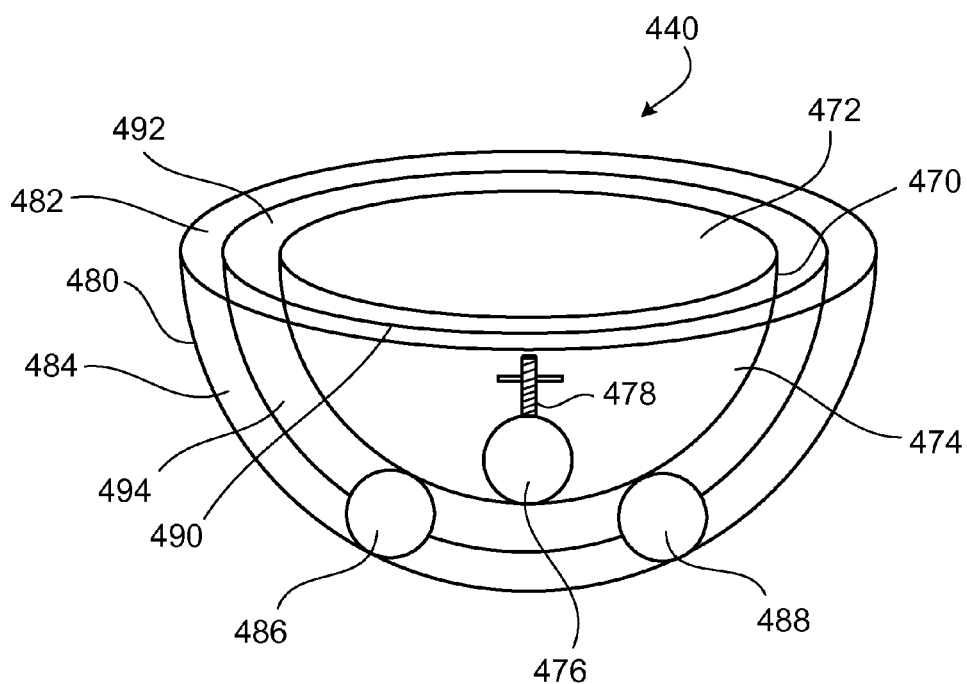
FIG. 4 is an exploded isometric view of an embodiment of a joint of the invention.

Referring to FIG. 4, a triple articulated joint 440 includes surfaces 470, 480 and 490, and sphere 476. Surface 470 is any arcuate surface having a concave surface 472 and a convex surface 474. Surface 490 is an arcuate surface, larger in size than surface 470, and having a concave surface 492 and a convex surface 494. Surface 480 is an arcuate surface, larger in size than surfaces 470 and 490, and having a concave surface 482 and a convex surface 484. Supporting spheres 486 and 488 are mounted to concave surface 482, or partially inset in surface 480 and extending out of concave surface 482, such that they extend through surface 490 and out of concave surface 492.

Supporting spheres 486 and 488 can be mounted at different places along concave surface 482 to vary the magnetic distribution of joint 440. More supporting spheres can be added along concave surface 382 for additional magnetic strength.

Convex surface 474 of surface 470 is magnetically coupled to supporting spheres 486 and 488. Sphere 476 is magnetically coupled to concave surface 472 of surface 470.

Joint 440 can be used to magnetically connect two parts of a mannequin where, first, convex surface 484 of surface 480 is mounted to a first mannequin part, second, sphere 476 is mounted to a second mannequin part by means of threaded rod 478, such that sphere 476 at least partially extends from the second mannequin part, and third, surface 480 and sphere 476 are movably and magnetically coupled.

The embodiments illustrated by FIGS. 3 and 4 provide for a stronger magnetic pull through the use of more metal in the form of additional surfaces and supporting spheres, thus enabling the mannequin to support more weight. The use of multiple nested arcuate surfaces enables simultaneous motion in different directions, which is useful in depicting joints with multiple moving parts, for example, the hip joint, where the hips and torso may need to move in different directions independently of one another. The use of multiple nested arcuate surfaces can also serve to limit the range of motion of the joint, and thus can be used in replicating joints that have more restricted mobility, such as the hip joint.

Although the embodiments depicted in FIGS. 3 and 4 show two supporting spheres, the invention can include any number of supporting spheres, for example, 2, 3, 4, 5, 6 or more supporting spheres. In embodiments having multiple supporting spheres, one or more of the supporting spheres can be magnetic. Alternatively, in embodiments having multiple supporting spheres, one or more of the supporting spheres can lack magnetic properties. Further yet, in embodiments having multiple supporting spheres, a combination of magnetic and non-magnetic spheres can be used. The magnetic strength of joints 340 and 440 can be varied, in one way, by varying the number, size and orientation of the supporting spheres, as well as the spacing between them.

Figure 5:
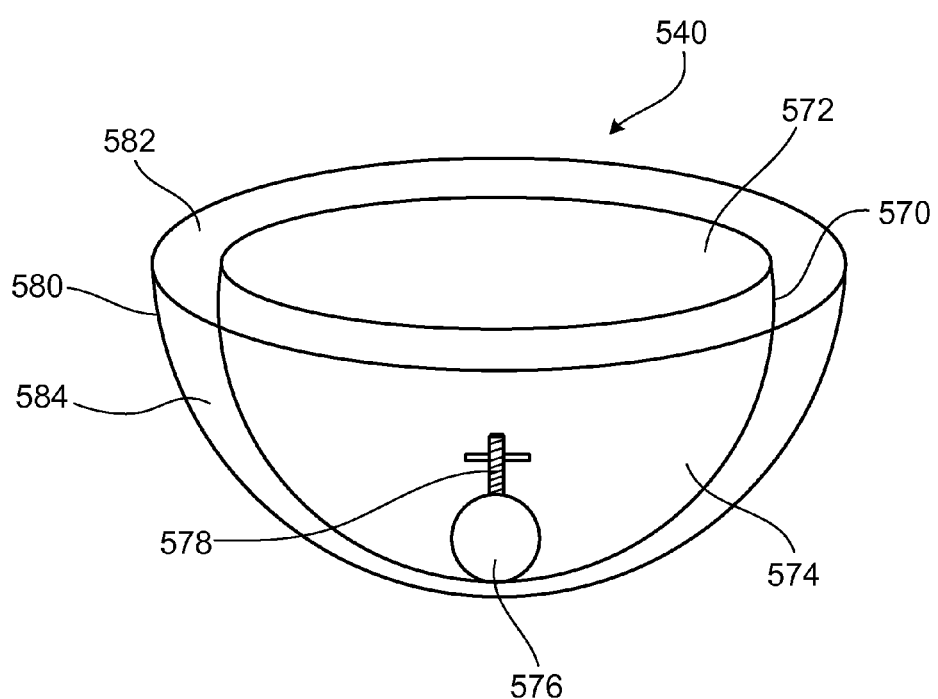
FIG. 5 is an exploded isometric view of an embodiment of a joint of the invention.

Referring to FIG. 5, joint 540 is a double nested joint made up of surfaces 570 and 580, and sphere 576. Surface 570 is any arcuate surface having a concave surface 572 and a convex surface 574. Surface 580 is an arcuate surface having a concave surface 582 and a convex surface 584. Surface 580 is larger in size than surface 570, such that surface 570 is nested within surface 580. Sphere 576 is magnetically coupled to concave surface 572. Convex surface 574 is magnetically coupled to concave surface 582.

Joint 540 can be used to magnetically connect two parts of a mannequin where, first, convex surface 584 of surface 580 is mounted to a first mannequin part, second, sphere 576 is mounted to a second mannequin part by means of threaded rod 578, such that sphere 576 at least partially extends from the second mannequin part, and third, surface 580 and sphere 576 are moveably and magnetically coupled. Joint 540 allows for smooth relative motion of surfaces 570 and 580 since the two surfaces are in direct contact and convex surface 574 lies flush along concave surface 582. Joint 540 also allows for a greater range of motion than joint 340 in FIG. 3 since no distance needs to be maintained between surfaces 570 and 580. However, because no magnetic supporting spheres are present in joint 540, joint 340 has greater magnetic strength than joint 540.

Figure 6:
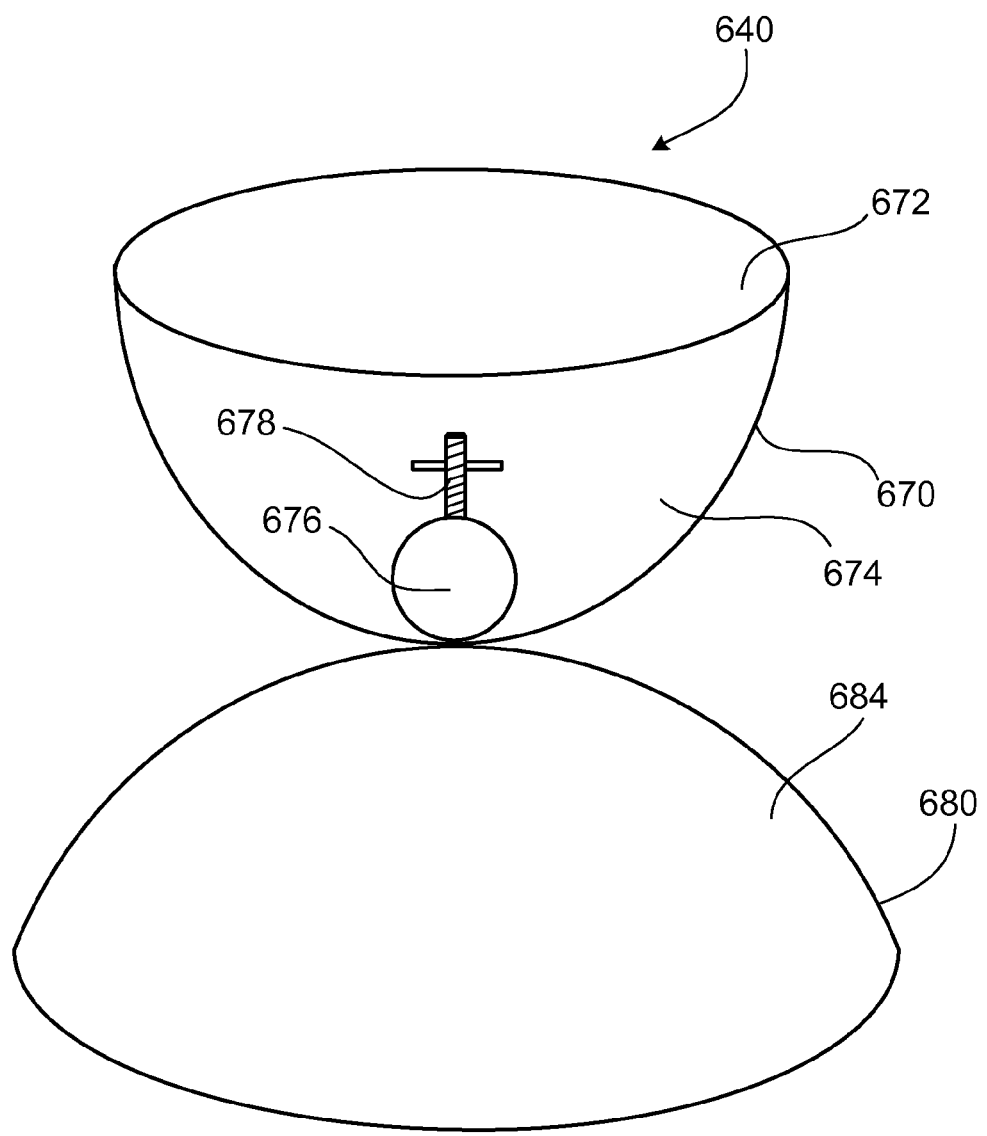
FIG. 6 is an exploded isometric view of an embodiment of a joint of the invention.

Referring to FIG. 6 joint 640 is made up of surfaces 670 and 680, and sphere 676. Surface 670 is any arcuate surface having a concave surface 672 and a convex surface 674. Surface 680 is any arcuate surface having a concave surface 682 (not shown in FIG. 6) and a convex surface 684. Sphere 676 is magnetically coupled to concave surface 672 of surface 670. Convex surface 674 of surface 670 is magnetically coupled to convex surface 684 of surface 680.

Joint 640 can be used to magnetically connect two parts of a mannequin where, first, sphere 676 is mounted to a first mannequin part by means of threaded rod 678, such that sphere 676 at least partially extends from the first mannequin part, second, the first mannequin part is magnetically coupled to surface 670, third, concave surface 682 (not shown in FIG. 6) is mounted to a second mannequin part, and fourth, convex surface 674 is moveably and magnetically coupled to surface 680.

Joint 640 has an unimpeded range of motion because convex surface 674 can orbit around the entire convex surface 684 without limitation. Although in FIG. 6 surface 680 is depicted as a hemisphere, surface 680 could be any arcuate surface, including a sphere, in which case the range of motion of joint 640 would be much greater.

Figure 7A:
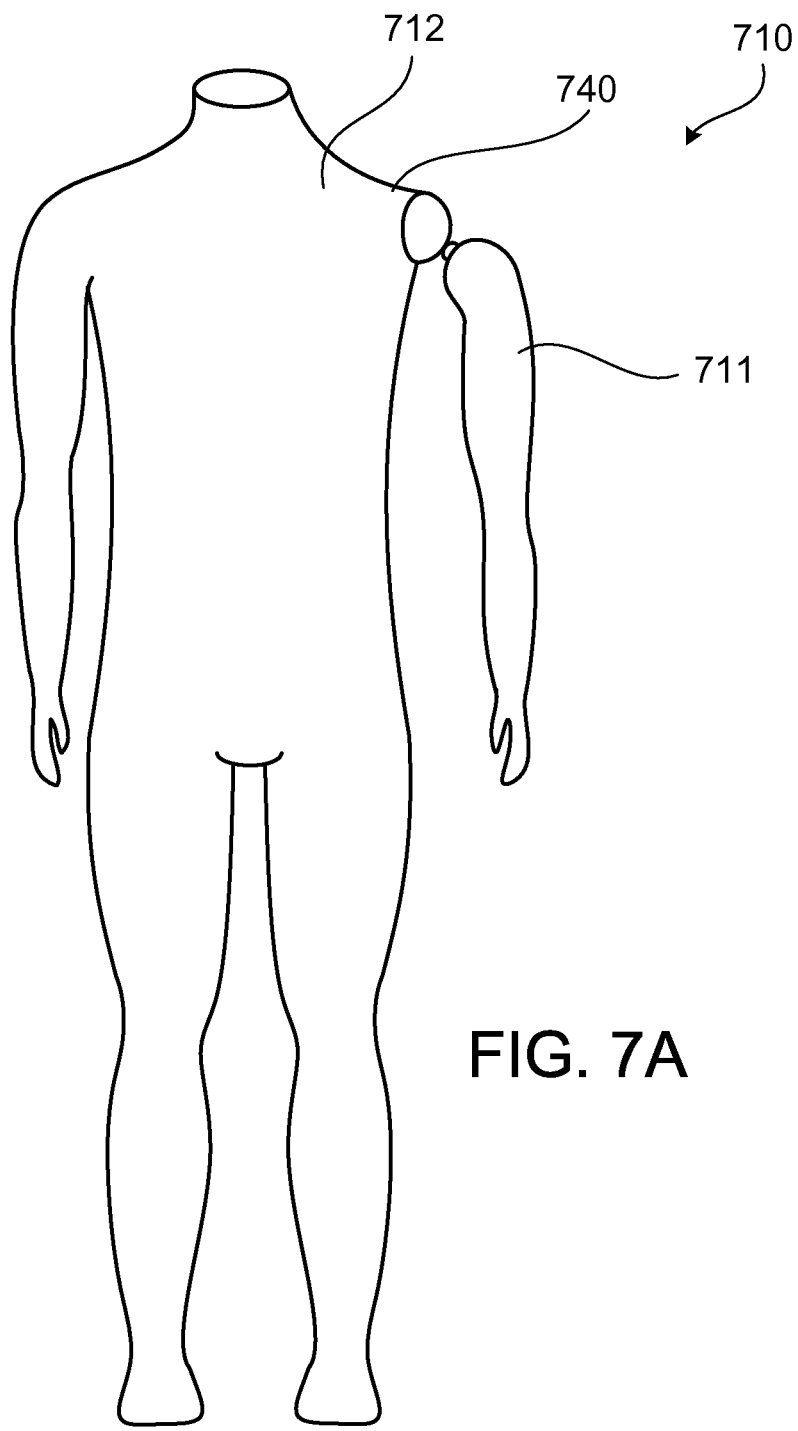
FIG. 7A is a front view of a mannequin embodying aspects of a joint of the invention.
Figure 7B:
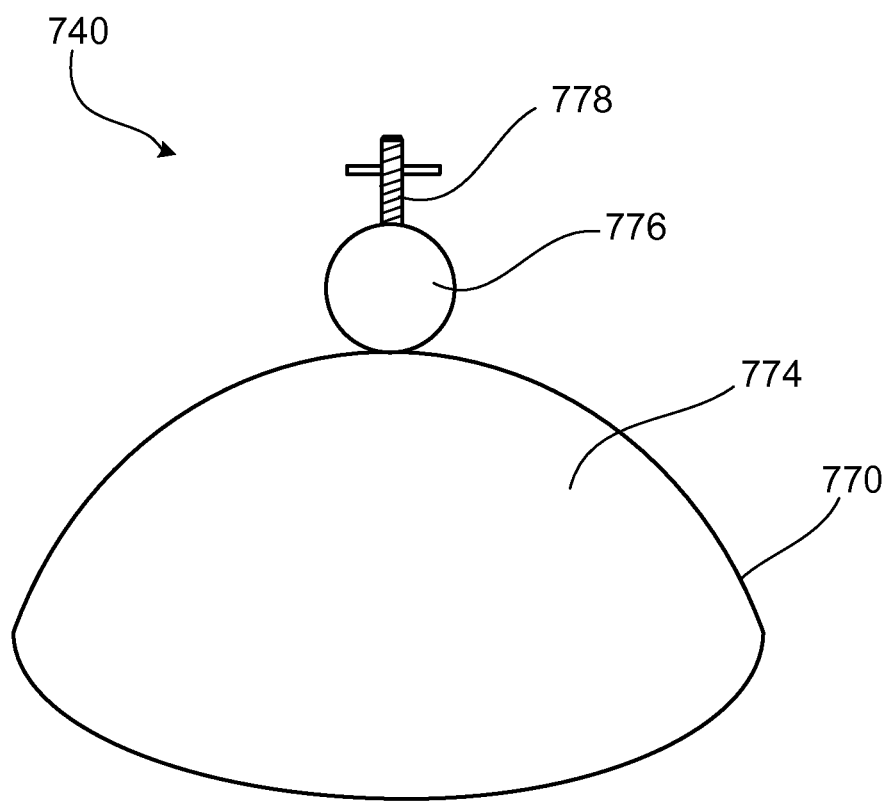
FIG. 7B is an exploded isometric view of an embodiment of a joint of the invention.

Referring to FIGS. 7A and 7B, joint 740 includes a reverse ball and socket arrangement. Joint 740 acts as a shoulder joint, magnetically coupling torso 712 and limb 711. The magnetic coupling of joint 740 allows for a wide range of motion of limb 711.

Referring to FIG. 7B, joint 740 is made up of surface 770 and sphere 776. Surface 770 is any arcuate surface, for example, a hemisphere, or a portion of a sphere, having a concave surface 772 (not shown in FIG. 7B) and a convex surface 774. Sphere 776 is magnetically coupled to convex surface 774 of surface 770.

Joint 740 can be used to magnetically connect two parts of a mannequin where, first, sphere 776 is mounted to a first mannequin part by means of threaded rod 778, such that sphere 776 at least partially extends from the first mannequin part, second, concave surface 772 (not shown in FIG. 7B) is mounted to a second mannequin part, and third, convex surface 774 is moveably and magnetically coupled to sphere 776.

Joint 740 can allow for a wider range of motion than joints 40, 240, 340, 440, 540 and 640. Instead of being nested within a concave surface, sphere 776 is magnetically coupled to a convex surface, therefore the range of motion is limited only by the portion of convex surface 774 that is exposed to contact with sphere 776, as shown in FIG. 7A.

Unlike joint 640, the absence of an intervening arcuate surface, like surface 670 in FIG. 6, allows for a direct connection between sphere 776 and convex surface 774, thus allowing for a gliding motion of the mannequin part along convex surface 774. The absence of an intervening steel surface, such as surface 670, also enables a mannequin part that could not fit within concave surface 772, due to either its size or shape, to be mounted directly onto threaded rod 778 without restrictions.

Although due to the absence of an arcuate surface like surface 670, joint 740 is weaker than joint 640 and can only support the weight of limb 711, a gasket similar to gasket 279 in FIG. 2B can be coupled to joint 740 to reinforce it and allow it to support additional weight.

Figure 8:
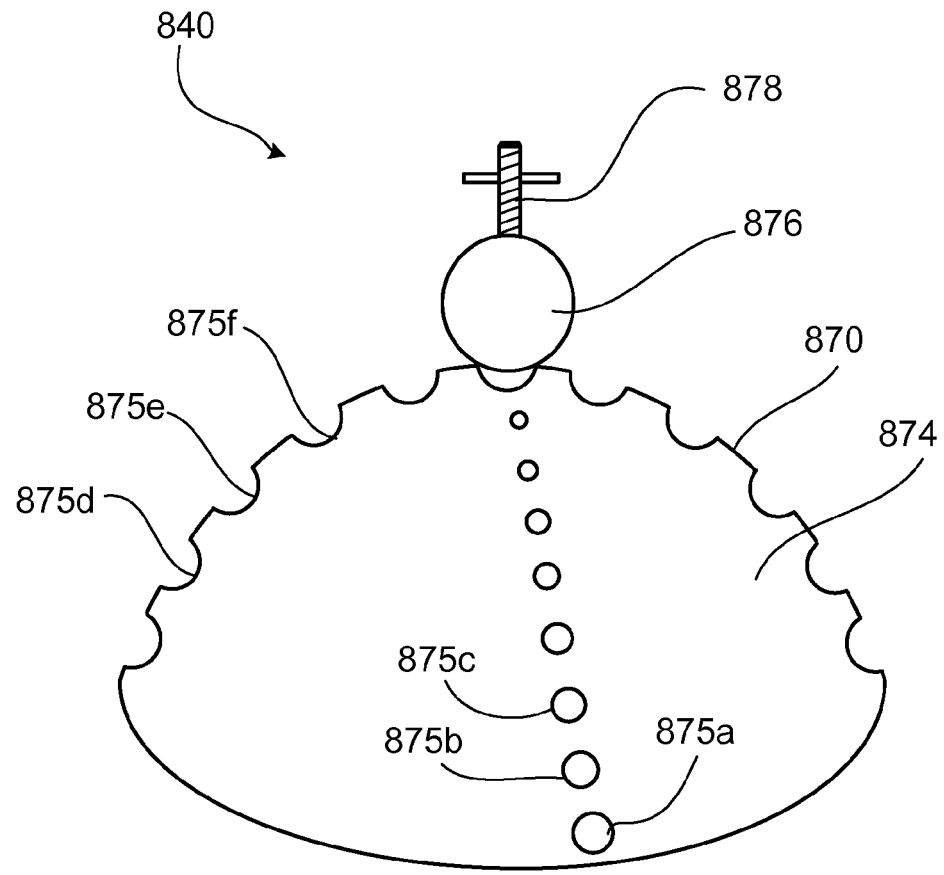
FIG. 8 is an exploded isometric view of an embodiment of a joint of the invention.

Referring to FIG. 8, joint 840 is made up of surface 870 and sphere 876. Surface 870 is any arcuate surface, for example, a hemisphere, or a portion of a sphere, having a concave surface 872 (not shown in FIG. 8) and a convex surface 874. Convex surface 874 of surface 870 has multiple depressions 875a, 875b, 875c, etc. Sphere 876 is magnetically coupled to convex surface 874 of surface 870. The depressions in surface 870 result in an increased friction characteristic and increased magnetic strength between sphere 876 and surface 870.

Depressions 875a, 875b, 875c, etc. trap the magnetic strength of sphere 876, thus creating a stronger magnetic concentration than could otherwise be achieved on a smooth surface. Depressions 875a, 875b, 875c, etc. also allow sphere 876 to maintain an optimal axial north-south polarity orientation such that the strongest bond is created between sphere 876 and convex surface 874.

Joint 840 can be used to magnetically connect two parts of a mannequin where, first, sphere 876 is mounted to a first mannequin part by means of threaded rod 878, such that sphere 876 at least partially extends from the first mannequin part, second, concave surface 872 (not shown in FIG. 8) is mounted to a second mannequin part, and third, surface 870 is moveably and magnetically coupled to sphere 876.

Figure 9:
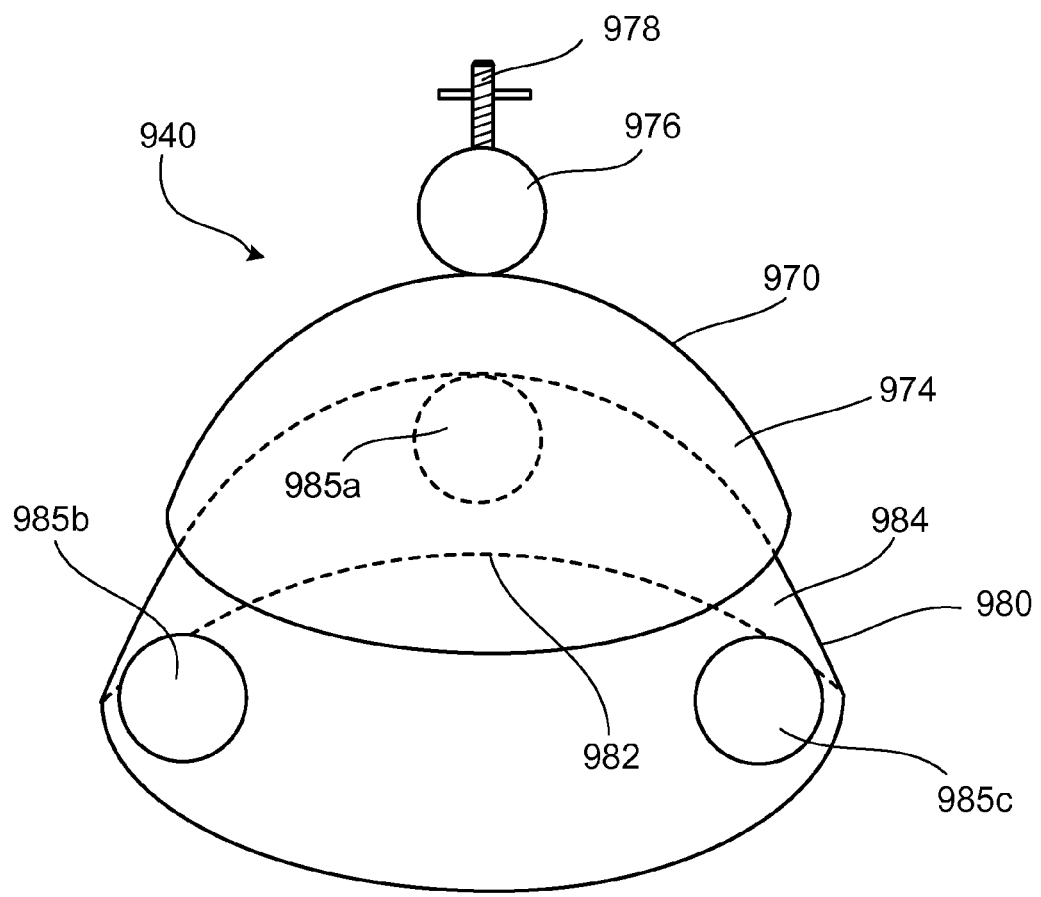
FIG. 9 is an exploded isometric view of an embodiment of a joint of the invention.

Referring to FIG. 9, joint 940 is made up of surfaces 970 and 980, and sphere 976. Surface 970 is any arcuate surface having concave surface 972 (not shown in FIG. 9) and a convex surface 974. Surface 980 is any arcuate surface having a concave surface 982 and a convex surface 984. Sphere 976 is magnetically coupled to convex surface 974 of surface 970. Concave surface 972 of surface 970 is magnetically coupled to convex surface 984 of surface 980 by means of the magnetic pull of sphere 976 and spheres 985a, 985b, 985c, etc.

Joint 940 allows a separate non-magnetic surface 970 to glide between magnetic sphere 976 and magnetized surface 980. The magnetic strength of joint 940 is greatest when sphere 976 and magnetic spheres 985a, 985b and 985c are optimally aligned. The magnetic strength of joint 940 can be varied by changing the number, size and orientation of magnetic spheres aligned with concave surface 982.

Joint 940 can be used to magnetically connect two parts of a mannequin where, first, sphere 976 is mounted to a first mannequin part by means of threaded rod 978, such that sphere 976 at least partially extends from the first mannequin part, second, magnetic spheres 985a, 985b and 985c are coupled to concave surface 982 of surface 980, third, concave surface 982 is mounted to a second mannequin part, fourth, concave surface 972 (not shown in FIG. 9) is coupled to convex surface 984, and fifth, sphere 976 and surface 970 are moveably and magnetically coupled. Magnetic spheres 985a, 985b and 985c can be mounted at different places along concave surface 982 to vary the magnetic distribution of joint 940. Further, more magnetic spheres can be added along concave surface 982 for additional magnetic strength.

Figure 10:
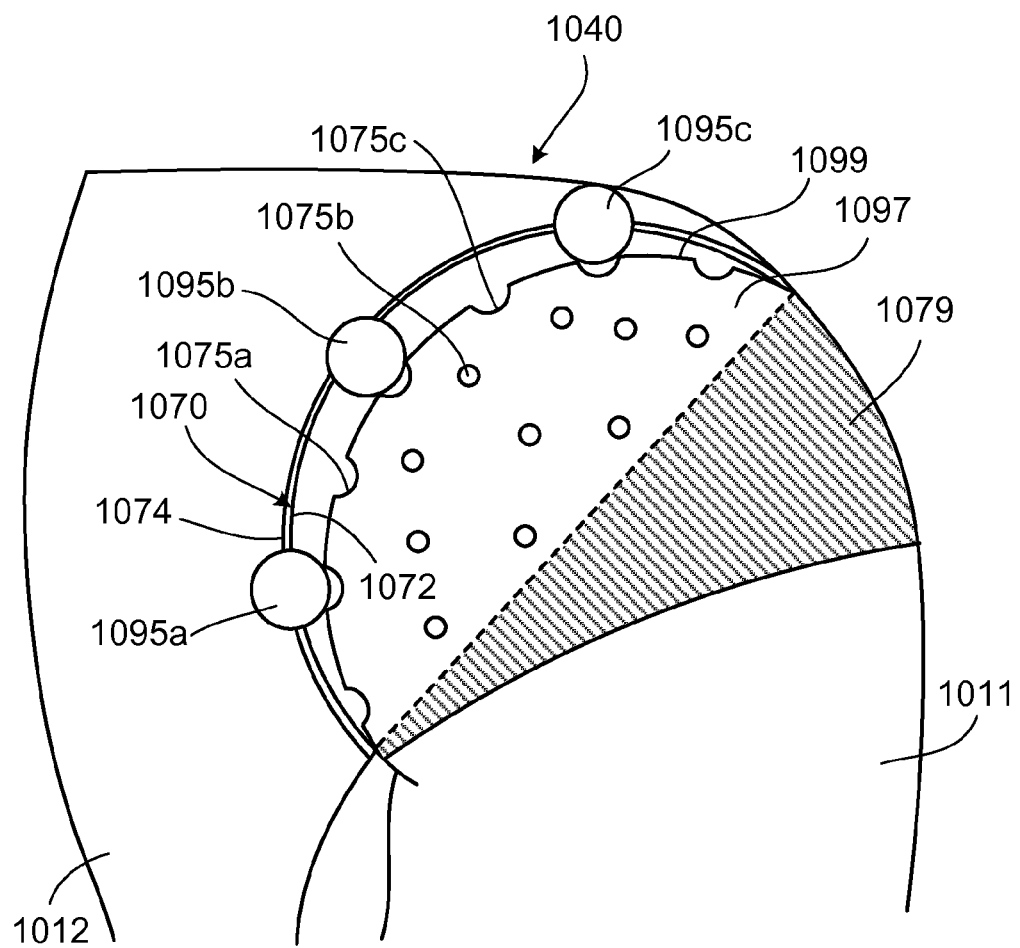
FIG. 10 is an exploded cross-section view of an embodiment of a shoulder joint of the invention.

Referring now to FIG. 10, a joint 1040 is positioned in a reverse manner between limb 1011 and torso 1012 as compared to other embodiments described herein. Joint 1040 includes surfaces 1070 and 1099, and spheres 1095a, 1095b, 1095c, etc. Surface 1070 is mounted such that convex surface 1074 is attached to torso 1012. Spheres 1095a, 1095b and 1095c are mounted to surface 1070 such that they extend or protrude through surface 1070 and out of concave surface 1072. Surface 1099 can be any arcuate surface having a concave surface 1098 (not shown in FIG. 10) and a convex surface 1097.

Convex surface 1097 of surface 1099 has multiple depressions 1075a, 1075b, 1075c, etc. Joint 1040 can be used to magnetically connect torso 1012 with limb 1011 where, first, concave surface 1098 is mounted to limb 1011, second, surface 1070 is mounted to torso 1012, and third, spheres 1095a, 1095b, 1095c, etc. are moveably coupled to surface 1099. In one embodiment, spheres 1095A, 1095b, 1095c, etc. are magnetic spheres, such as magnetized ball bearings. In other embodiments, depressions 1075a, 1075b, 1075c, etc. are magnetized to magnetically couple with spheres, 1095a, 1095b, 1095c, etc While FIG. 10 shows three magnetic spheres 1095a, 1095b and 1095c, joint 1040 can have one or any number of magnetic spheres along surface 1070. Magnetic spheres 1095a, 1095b, 1095c, etc. can be mounted at different places along surface 1070 and at different orientations to vary the magnetic distribution of joint 1040. Magnetic spheres 1095a, 1095b, 1095c, etc. can be more or less recessed into surface 1070 and can have different sizes. Further, more magnetic spheres can be added along surface 1070 for additional magnetic strength.

In various embodiments, the arrangement of magnetic spheres 1095a, 1095b, 1095c, etc. can be in a regular pattern or constellation, with depressions 1075a, 1075b, 1075c, arranged accordingly to receive the spheres at regular intervals. Depressions 1075a, 1075b, 1075c, can magnetically couple with all magnetic spheres provided or with less than all magnetic spheres provided.

The depressions in convex surface 1097 result in an increased friction characteristic and increased magnetic strength between spheres 1095a, 1095b, and 1095c and surface 1099. Convex surface 1097 can have any number of depressions 1075a, 1075b, 1075c, etc.

In some embodiments, multiple spheres can be provided in a regular or random pattern, wherein less than all the spheres are magnetized. In other embodiments, multiple spheres can be provided as well as multiple depressions for receiving the spheres. The number of depressions can equal or be greater than the number of spheres. All of the depressions can be magnetized or less than all the depressions can be magnetized.

In embodiments, multiple spheres can be provided, wherein at least two spheres are of different sizes or shapes. In embodiments, multiple depressions can be provided wherein at least two depressions have different sizes or shapes.

Joint 1040 can also include gasket 1079. In FIG. 10, gasket 1079 extends around the perimeter of limb 1011 at the point where limb 1011 joins torso 1012. Gasket 1079 can be made of various materials including silicone, urethane rubber or foam rubber. Gasket 1079 can have different shapes, sizes and thicknesses to vary the friction properties as well as aesthetics of joint 1040. Gasket 1079 provides additional friction, which helps to keep joint 1040 in place and enables it to support more weight. Further, gasket 1079 can enable joint 1040 to maintain an optimal distance between surface 1099 and spheres 1095a, 1095b and 1095c to ensure a complete range of motion. Further yet, gasket 1079 can wrap around the entire joint 1040 in order to conceal its structure and mimic a smooth human-like skin surface.

Other embodiments are included within the scope of the claims.

What is claimed is:

1. An apparatus for movably joining two elements of a mannequin comprising:
   a first element having an external arcuate surface further comprising a plurality of depressions in the form of through holes surrounded by a smooth outer surface; and
   a second element having an arcuate surface similar in profile to the first element and further comprising two or more magnetic spheres mounted and extending outward along the surface, the second element movably and rotatably engageable with the first element along the arcuate surface of the first element via the magnetic spheres, the second element further directly magnetically coupled to the first element via the magnetic spheres,
   wherein when the mannequin joint is in a static position, at least some of the two or more magnetic spheres are contact with at least some of the plurality of depressions of the first element, and wherein when the mannequin joint is in transition, at least some of the two or more magnetic spheres are contact with the smooth outer surface of the first element.

2. The apparatus of claim 1 wherein the external arcuate surface is convex.

3. The apparatus of claim 1 further comprising a flexible gasket mounted to the second element.

4. The apparatus of claim 1 wherein the external arcuate surface is coupled to the torso of the mannequin and the magnetic spherical portion is coupled to a limb of the mannequin.

5. The apparatus of claim 1 wherein the external arcuate surface is coupled to the torso of the mannequin and the magnetic spherical portion is coupled to the head of the mannequin.

* * * * *